United States Patent Office 2,727,033
Patented Dec. 13, 1955

2,727,033

TREATMENT OF PECTOUS WASTE

Daniel P. Norman, Ipswich, Mass., assignor to New England Spectrochemical Laboratories, Ipswich, Mass., a partnership No Drawing. Continuation of applications Serial Nos. 86,397, 86,398, 86,399, April 8, 1949. This application May 31, 1951, Serial No. 229,290

7 Claims. (Cl. 260—209.5)

This invention relates to the treatment of pectous waste, and more particularly to the preparation of industrially useful products therefrom.

This is a continuation of my copending applications, Serial Nos. 86,397, 86,398, and 86,399, all filed April 8, 1949, and now abandoned.

The disposal of citrus waste such as orange peel and pulp presents serious difficulties because of its fermentability and the conquent undesirable odors involved and because of the high B. O. D. (biological oxygen demand) of the material. The high water content of citrus waste and the difficulty of its removal has added to the problem. Hitherto, processes have been proposed for disposing of waste from citrus canneries by transforming it into food stuff material, such as pectins or cattle feed, but so far as I am aware no one prior to this invention has ever succeeded in producing from such waste a hard, white, odorless product suitable for industrial use.

An object of this invention is to provide a simple, advantageous and effective process for treating pectous waste. A further object is to provide a process for treating citrus waste to produce industrially useful and valuable products.

In accordance with the present invention the above and other objects are attained by treating pectous waste with an organic liquid selected from the group consisting of methanol, ethanol, n-propanol, isopropanol, n-butanol, secondary butanol, tertiary butanol, normal amyl alcohol, iso-amyl alcohol, acetone, dioxane, methyl acetone, methyl ethyl ketone, diacetone alcohol and cyclohexanone, and replacing the water content of the pectous waste with said organic liquid, whereby the pectous waste is rendered firm and non-gelatinous, and then removing the liquid, whereby there remains a hard, firm, non-hygroscopic residue or educt. This educt may be readily comminuted to powder form.

The residue or educt remaining after citrous waste from cannery juicing operations is treated with an organic liquid in accordance with this invention is hard, light-colored, odorless, non-hygroscopic, and chemically and thermally stable. It consists essentially of dried cellulosic and non-gelatinous pectic substances substantially free from sugar and from the naturally-occurring terpenes, aldehydes, alcohols, ketones and pigments constituting the natural oils, color- and odor-producing substances of the citrous waste. It is substantially non-gelling in the presence of water. The educt of this invention contains reactive organic radicals such as hydroxyl and carboxyl groups which are capable of chemically reacting with partially reacted thermosetting resins such as phenol-, urea-, and melamine-formaldehyde resins. The educt of this invention therefore has a highly useful industrial application as an extender and carrier for resins, other polymers, and adhesives, and in view of its chemical reactivity it may be employed as a desirable reactive component of polymer and adhesive compositions and thereby diminish substantially the amount of expensive resin or other polymer components required in manufacturing a plastic article of conventional specification.

The action of the organic liquid is more than that of a mere solvent for essential oils and the like and may involve complex reactions such as the denaturation of proteins because the educt from the organic liquid treatment is much less sensitive to heat then the waste was prior to the treatment. The organic liquid serves also to harden, shrink and render non-gelatinous the rag and peel in the case of citrus waste with the result that following the organic liquid treatment of this invention the educt may be readily dried.

The pectous material to be treated by the process of this invention may be of wide variety. It is commonly waste, but the term "waste" is to be interpreted sufficiently broadly to refer to any pectous material utilized for the purposes of this invention. Thus, for example, there may be employed for the purposes of the invention the pectous waste remaining from potatoes after potato starch removal, the apple pomace from cider operations, orange, grape fruit, or tangerine waste from citrus juicing operations, tomato waste from canning operations, and peelings from carrots.

Citrus waste to be treated may be of any convenient size or shape. Thus the half shells of orange peel as received from cannery juicing operations may be treated directly with the organic liquid. However, because of the greater ease in handling, and somewhat greater rapidity of treatment, I prefer to comminute the waste prior to the organic liquid treatment. The particle size of the comminuted waste is not critical nor need it be uniform. A particle size such as produced by a conventional food chopper having face plate apertures of about ⅛ inch diameter is convenient for the practice of the invention.

The organic liquid to be employed for replacing the water content of the citrus material is water-miscible and is selected from the group consisting of methanol, ethanol, n-propanol, isopropanol, n-butanol, secondary butanol, tertiary butanol, normal amyl alcohol, iso-amyl alcohol, acetone, dioxane, methyl acetone, methyl ethyl ketone, diacetone alcohol and cyclohexanone.

The replacement of the water content of the citrus materials by the organic liquid may be carried out in any suitable manner, for example, by batch treatment, by Soxhlet type of extraction or by countercurrent continuous flow of organic liquid.

The time required for the displacement of the water content of the pectous material by the organic liquid is dependent upon the rate of diffusion of the organic liquid into the pectous material and the rate of diffusion of the water content, and water-soluble and organic liquid-soluble content out of the pectous material. It is convenient to soak citrus waste in the organic liquid overnight before continuing with the displacement operation.

The organic liquid treatment is preferably carried out at room temperature but in many cases the treatment may be accelerated by the use of elevated temperatures.

It will be understood that water-soluble and organic liquid-soluble materials, separated from the citrus or other pectous waste by the process of this invention, may be recovered or utilized in any suitable manner.

In certain cases, the organic liquid with which the citrus waste is treated may be saturated with an alkali or alkaline compound. Such a saturated organic liquid may be used for the entire treatment, or may be employed only for the initial treatment, with subsequent treatments being carried out with the organic liquid containing no dissolved alkali. The use of alkali-saturated organic liquid tends to reduce the polymerization of extracted constituents during their separation from the organic liquid. The primary purpose of such alkali-saturated organic liquid is to control the quality of the educt. The educt prepared by the use of alkali-saturated organic liquid remains acid in character. The use of alkali-saturated organic liquid makes possible the control of the character of the educt for certain special purposes. Thus, educt prepared in this manner tends to have fewer carboxyl groups and tends to be less reactive.

While, as hereinbefore mentioned, the principles of this invention may be applied to pectous material in general, the invention will be specifically illustrated herein with respect to orange peel and pulp produced from juicing operations in the preparation of canned orange juice.

Specific examples in accordance with this invention are as follows:

*Example 1*

One kilogram of orange waste resulting from the juicing of oranges was extracted 18 times in a Soxhlet type of extractor with 700 milliliters of methanol at about 20° C. The solids were drained and were found to be very firm even before the drying operation. The drained solids were dried in a constant temperature oven at 110° C. The resulting dried educt, 93.5 grams in amount, was firm, white and only slightly odorous. The educt was readily ground to a fineness of 100 mesh.

*Example 2*

One kilogram of orange waste was ground in a food chopper having ⅛ inch holes in the face plate. The ground waste was then extracted 24 times in a Soxhlet type of extractor with 700 mililiters of 95% ethanol. The solids were drained and then dried under infra-red lamps. The resulting educt was firm, white and practically odorless, and was 84.1 grams in amount. The educt was readily comminutable to a fine powder.

*Example 3*

One kilogram of orange peel from a cannery was cut into small pieces which were less than ¼" in any dimension. The pieces of peel were extracted for eight hours in a Soxhlet type of extractor with 700 milliliters of n-propanol. The extracted material was then dried and ground to a fineness of 100 mesh. The educt was 93.8 grams in amount and was a white, odorless, non-hygroscopic, relatively insoluble powder of attractive appearance.

*Example 4*

100 grams of ground orange peel were extracted 15 times in a Soxhlet type of extractor with 300 milliliters of 91% of isopropanol. The product was drained and dried at 100° C. The educt was 10 grams in amount and was hard, white, odorless and non-hygroscopic. The educt was readily and rapidly ground to a fineness of 100 mesh.

*Example 5*

One kilogram of orange peel from a cannery was ground in a food chopper and was extracted overnight in a Soxhlet type of extractor with 800 milliliters of 99% of isopropanol. The extracted material was drained and dried under infra-red lamps. The yield was 102.3 grams of white, hard and odorless educt.

*Example 6*

400 grams of orange peel were chopped to about ⅛ inch pieces and were treated 8 times for one-half hour at a time with 400 milliliters of isopropanol under strong agitation of a propeller type stirrer. The solids were drained and dried under infra-red lamps. The educt was 47.2 grams of white, odorless, non-hydroscopic material which was readily ground to a fineness of 100 mesh.

*Example 7*

11 pounds of orange peel were cut to particles of less than ¼" dimension in a food chopper. The ground peel was placed in the basket of a 12" chemical centrifugal extractor which was provided with a filter cloth over the perforations in the basket in order to prevent loss of fines. The peel was covered with three gallons of a saturated solution of calcium carbonate in 91% isopropanol, and the mixture was permitted to stand overnight. The isopropanol was then removed by centrifugation, the peel covered with three gallons of fresh 91% isopropanol, agitated within the centrifuge basket with a propellor type agitator for 40 minutes, and centrifugally drained. The treatment with 91% isopropanol was carried out 6 times more, with agitation and centrifugal drainage each time. After the final drainage, the educt was substantially dry to the touch, colorless except for a few crowns and seed hulls, and very firm. The educt was readily and rapidly dried to a fine, white non-hygroscopic powder. The yield was 1.38 pounds of educt, namely, slightly more than 12.5% of the original wet weight of the peel.

*Example 8*

150 grams of orange waste from cannery juicing operations were extracted with 200 milliliters of n-butanol for 6 hours in a Soxhlet type of extractor. The product was drained and then dried under infra-red lamps. The yield was 18.0 grams of educt in the form of firm, light colored, practically odorless solids.

*Example 9*

150 grams of orange waste were extracted for 6 hours with 200 mililiters of secondary butanol in a Soxhlet type of extractor. The educt was drained and then dried under infra-red lamps. The yield was 18.7 grams of dry, light colored product.

*Example 10*

150 grams of orange waste were extracted in a Soxhlet type of extractor with tertiary butanol maintained at a temperature between 27 and 30° C. The educt was drained and was found to be very firm and dry even before placed in a drying oven in which it was dried overnight at a temperature of 110° C. The educt was 22.4 grams in amount and it was easily ground and non-hygroscopic. It retained however a slight solvent odor.

*Example 11*

150 grams of comminuted orange waste were extracted in a Soxhlet type of extractor with 200 milliliters of n-amyl alcohol for 7 hours. The educt was drained and then dried under infra-red lamps. The yield of educt was 23.3 grams and the educt was light in color and slightly odorous.

*Example 12*

150 grams of comminuted orange waste were extracted with 200 milliliters of iso-amyl alcohol for 8 hours in a Soxhlet type of extractor. The educt was drained and then dried under infra-red lamps. The yield was 28.8 grams and the product was a solid material of yellowish color and slightly odorous.

*Example 13*

1 kilogram of orange peel and rag from cannery juicing preparations was extracted 14 times in a Soxhlet type of extractor with 700 milliliters of acetone. The educt drained very readily and was exceptionally hard, odorless and white. The yield was 121.8 grams of non-hygroscopic product which was readily ground.

*Example 14*

200 grams of orange waste were extracted for 4½ hours in a Soxhlet type of extractor with 200 milliliters of dioxane. The educt was firm and easily drained. It was then dried under infra-red lamps. The yield was 17.1 grams of a hard, white, odorless, non-hygroscopic educt which was readily ground to a fineness of 100 mesh.

*Example 15*

150 grams of orange waste were extracted for 3 hours in a Soxhlet type of extractor with 200 milliliters of methyl acetone. The solids drained readily and were then dried. The yield of educt was 19.0 grams and the educt was light colored, odorless and non-hygroscopic in character.

*Example 16*

100 grams of orange waste were extracted in a Soxhlet type of extractor with 100 milliliters of methyl ethyl ketone. The solids were drained and then dried under infrared lamps. The yield was 11 grams of educt which was firm in character and relatively light in color.

*Example 17*

150 grams of orange waste were extracted for 2½ hours with 120 milliliters of diacetone alcohol in a Soxhlet type of extractor. The solids were drained and then dried. The educt was 17.6 grams in amount and was hard, solid and relatively light in color.

*Example 18*

150 grams of orange waste were extracted for 4½ hours in a Soxhlet type of extractor with 200 milliliters of cyclohexanone. The solids were drained and dried. The educt was 26.9 grams in amount and of a somewhat oily character.

It has been found that the presence of traces of certain ketonic solvents is frequently undesirable when the educt of this invention is used in association with thermosetting resins, because of incompatibility with such resins. These traces of incompatible liquid may be avoided effectively by displacing the ketonic liquid with another and compatible organic liquid which is miscible therewith, and then removing the second organic liquid. Thus, acetone may be displaced effectively with iso-propanol.

*Example 19*

3 pounds of orange peel and rag from cannery juicing operations were extracted 10 times in a Soxhlet extractor with 700 milliliters of acetone. The solids were removed from the extractor, drained on a Buchner funnel, and washed three times with 400 milliliters of anhydrous iso-propanol. The educt drained very readily and was exceptionally hard, and white. It was dried under infrared lamps to yield 5 ounces of a very hard, stable, non-hygroscopic product.

*Example 20*

9 pounds of educt prepared in the manner described in Example 6 were fairly mixed with one pound of an alcoholic solution of a phenolic resin. The mixture was placed under a molding pressure of 200 pounds per square inch for 15 minutes at a temperature of 325° F. There was produced a panel of 1" thickness which was firm and hard in character and suitable for use as a table top or for similar applications.

*Example 21*

Educt prepared in the manner described in Example 7 was ground to a fineness of 100 mesh and was used as an extender in an adhesive having the following composition:

| | Parts |
|---|---|
| Urea resin | 108 |
| Water | 60 |
| Extender | 100 |

The above composition was used successfully in the preparation of plywood. Because of the pH of the educt the extender functioned as a catalyst as well as an extender and no additional catalyst was required.

Having described my invention, what I claim as new and desire to secure by Letters Patent of the United States is:

1. In the preparation of an educt from pectous waste, containing water and water soluble constituents, the step which comprises extracting the waste with an organic liquid selected from the group consisting of methanol, ethanol, n-propanol, isopropanol, n-butanol, secondary butanol, tertiary butanol, normal amyl alcohol, iso-amyl alcohol, acetone, dioxane, methyl acetate, methyl ethyl ketone, diacetone alcohol and cyclohexanone until the water content of the waste has been non-evaporatively displaced therefrom and the water-soluble constituents have been separated from the waste.

2. The method of preparing an educt from pectous waste containing water and water soluble constituents which comprises extracting the waste with an organic liquid selected from the group consisting of methanol, ethanol, n-propanol, isopropanol, n-butanol, secondary butanol, tertiary butanol, normal amyl alcohol, iso-amyl alcohol, acetone, dioxane, methyl acetate, methyl ethyl ketone, diacetone alcohol and cyclohexanone until the water content of the waste has been non-evaporatively displaced therefrom, water-soluble constituents separated from the waste and the pectous content of the waste rendered firm and non-gelatinous, and removing the organic liquid, whereby constituents soluble in said organic liquid also are removed, leaving a hard, non-gelatinous, non-hygroscopic, readily comminutable educt.

3. The method of preparing an educt from citrus waste containing water and water soluble constituents which comprises comminuting the waste, extracting it with an organic liquid seleced from the group consisting of methanol, ethanol, n-propanol, isopropanol, n-butanol, secondary butanol, tertiary butanol, normal amyl alcohol, iso-amyl alcohol, acetone, dioxane, methyl acetate, methyl ethyl ketone, diacetone alcohol and cyclohexanone until the water content of the waste has been non-evaporatively displaced therefrom, water-soluble constituents separated from the waste, and the pectous content of the waste rendered firm and non-gelatinous, and removing the organic liquid, whereby constituents soluble in the organic liquid also are removed, leaving a hard, non-gelatinous, non-hygroscopic, readily comminutable educt.

4. The method of preparing an educt from pectous waste containing water and water soluble constituents which comprises extracting the waste by Soxhlet extraction with an organic liquid selected from the group consisting of methanol, ethanol, n-propanol, isopropanol, n-butanol, secondary butanol, tertiary butanol, normal amyl alcohol, iso-amyl alcohol, acetone, dioxane, methyl acetone, methyl ethyl ketone, diacetone alcohol and cyclohexanone until the water content of the waste has been non-evaporatively displaced by the organic liquid, water-soluble constituents separated from the waste, and the pectous content of the waste rendered firm, non-hygroscopic and non-gelatinous, and removing the organic liquid whereby constituents soluble in the said organic liquid also are removed, leaving a hard, non-gelatinous, readily comminutable educt.

5. The method of preparing an educt from pectous waste containing water and water soluble constituents which comprises extracting the waste by intermittent counter-current flow of an organic liquid selected from the group consisting of methanol, ethanol, n-propanol, isopronanol, n-butanol, secondary butanol, tertiary butanol, normal amyl alcohol, iso-amyl alcohol, acetone, dioxane, methyl acetone, methyl ethyl ketone, diacetone alcohol and cyclohexanone until the water content of the waste has been non-evaporatively displaced by the organic liquid, water-soluble constituents separated from the waste, and the pectous content of the waste rendered firm, non-hygroscopic, and non-gelatinous, and removing the organic liquid, whereby constituents soluble in the said organic liquid also are removed, leaving a hard, non-gelatinous, readily comminutable educt.

6. The method of preparing an educt from pectous waste containing water and water soluble constituents which comprises extracting the waste by continuous counter-current flow of an organic liquid selected from the group consisting of methanol, ethanol, n-propanol, iso-propanol, n-butanol, secondary butanol, tertiary butanol, normal amyl alcohol, iso-amyl alcohol, acetone, dioxane, methyl acetate, methyl ethyl ketone, diacetone alcohol and cyclohexanone until the water content of the waste has been non-evaporatively displaced by the organic liquid, water-soluble constituents separated from the waste, and the pectous content of the waste rendered firm, non-hygroscopic, and non-gelatinous, and removing the organic liquid, whereby constituents soluble in the said organic liquid also are removed, leaving a hard, non-gelatinous, readily comminutable educt.

7. The method of preparing an educt from pectous waste containing water and water soluble constituents which comprises extracting the waste by refluxing exhaustively an organic liquid selected from the group consisting of methanol, ethanol, n-propanol, isopropanol, n-butanol, secondary butanol, tertiary butanol, normal amyl alcohol, iso-amyl alcohol, acetone, dioxane, methyl acetone, methyl ethyl ketone, diacetone alcohol and cyclohexanone until the water content of the waste has been non-evaporatively displaced by the organic liquid, water-soluble constituents separated from the waste, and the pectous content of the waste rendered firm, non-hygroscopic and non-gelatinous, and removing the organic liquid, whereby constituents soluble in the said organic liquid also are removed, leaving a hard, non-gelatinous, readily comminutable educt.

References Cited in the file of this patent

UNITED STATES PATENTS

| | | |
|---|---|---|
| 1,393,660 | Beylik | Oct. 11, 1921 |
| 1,654,131 | Leo | Dec. 27, 1927 |
| 1,976,741 | Mithoff | Oct. 16, 1934 |
| 2,479,270 | Schroeder | Aug. 16, 1949 |